US009694802B2

(12) United States Patent
Prescott et al.

(10) Patent No.: US 9,694,802 B2
(45) Date of Patent: Jul. 4, 2017

(54) VALVE ASSEMBLY

(71) Applicant: Haldex Brake Products Limited, Warwickshire (GB)

(72) Inventors: Robert David Prescott, Solihull West Midlands (GB); Laurence John Potter, Birmingham West Midlands (GB); Edward Gilbert Shaw, Worcestershire (GB)

(73) Assignee: Haldex Brake Products Limited, Nuneaton, Warwichshire (GB)

( * ) Notice: Subject to any disclaimer, the term of this patent is extended or adjusted under 35 U.S.C. 154(b) by 205 days.

(21) Appl. No.: 14/365,346

(22) PCT Filed: Dec. 13, 2012

(86) PCT No.: PCT/GB2012/053133
§ 371 (c)(1),
(2) Date: Jun. 13, 2014

(87) PCT Pub. No.: WO2013/088159
PCT Pub. Date: Jun. 20, 2013

(65) Prior Publication Data
US 2015/0123460 A1  May 7, 2015

(30) Foreign Application Priority Data

Dec. 14, 2011  (GB) .................................. 1121501.9
Mar. 22, 2012  (GB) .................................. 1205070.4

(51) Int. Cl.
*B60T 15/02* (2006.01)
*B60T 8/32* (2006.01)
(Continued)

(52) U.S. Cl.
CPC ............ *B60T 15/027* (2013.01); *B60T 8/327* (2013.01); *B60T 8/361* (2013.01); *B60T 13/268* (2013.01);
(Continued)

(58) Field of Classification Search
CPC ........ B60T 15/027; B60T 8/327; B60T 8/361; B60T 13/268
See application file for complete search history.

(56) References Cited

U.S. PATENT DOCUMENTS 3,844,625 A   10/1974  Ingram et al.
3,954,305 A   5/1976   Ingram et al.
(Continued)

FOREIGN PATENT DOCUMENTS

DE   1650571 A1   11/1970
GB   1 440 066    6/1976
(Continued)

OTHER PUBLICATIONS

Search Report dated Apr. 5, 2012, United Kingdom Patent Application No. GB1121501.9.
(Continued)

*Primary Examiner* — Vishal Sahni
(74) *Attorney, Agent, or Firm* — Young Basile Hanlon & MacFarlane, P.C.

(57) ABSTRACT

A valve assembly including a housing and a first movable member which divides the housing into a control chamber and a main chamber. A second movable member has a first valve part and a second valve part and is movable to engage the first valve part with a corresponding inlet valve part to substantially prevent flow of fluid into the main chamber via an inlet port. The first movable member is provided with an exhaust valve part and is movable to engage the second valve part of the second movable member to substantially prevent flow of pressurized fluid out of the main chamber via an exhaust port. A support part is secured relative to the housing, there being a first seal between the second movable member and the support part and a second seal between the support part and the first movable member.

19 Claims, 10 Drawing Sheets

Figure 1:
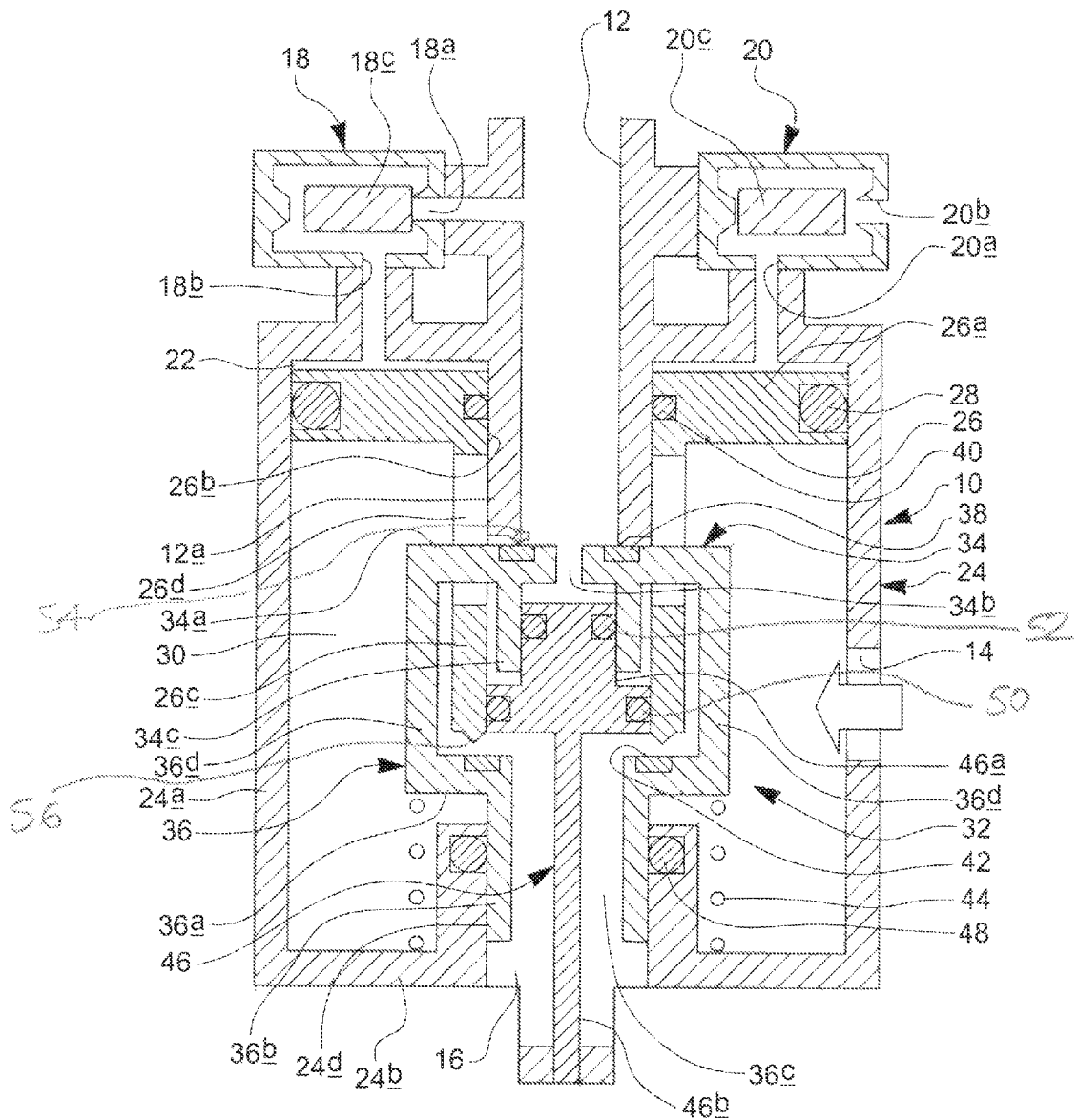

(51) Int. Cl.
  *B60T 8/36*   (2006.01)
  *B60T 13/26*  (2006.01)
  *F16K 31/06*  (2006.01)
  *F16K 31/42*  (2006.01)

(52) U.S. Cl.
  CPC .......... *F16K 31/0624* (2013.01); *F16K 31/42* (2013.01); *Y10T 137/86614* (2015.04); *Y10T 137/86694* (2015.04)

(56) References Cited

U.S. PATENT DOCUMENTS

| | | | |
|---|---|---|---|
| 4,050,746 A | | 9/1977 | Durling |
| 2002/0162587 A1 | | 11/2002 | Foster et al. |
| 2011/0297494 A1 | * | 12/2011 | Shaw .................... B60T 8/327 |
| | | | 188/152 |
| 2013/0263953 A1 | * | 10/2013 | Prescott .................. B60T 15/18 |
| | | | 137/625.42 |
| 2014/0345728 A1 | * | 11/2014 | Prescott .................. B60T 8/327 |
| | | | 137/624.27 |

FOREIGN PATENT DOCUMENTS

| | | |
|---|---|---|
| GB | 2 469 089 | 10/2010 |
| WO | 2010094962 | 8/2010 |
| WO | 2011021634 A1 | 2/2011 |
| WO | 2011151645 | 12/2011 |

OTHER PUBLICATIONS

Search Report dated Jul. 15, 2012, United Kingdom Patent Application No. GB1205070.4.
International Search Report dated Mar. 8, 2013, International Application No. PCT/GB2012/053133.

* cited by examiner

VALVE ASSEMBLY

CROSS-REFERENCE TO RELATED APPLICATIONS

This application is the national stage application of, and claims priority to, International Application No. PCT/GB2012/053133 filed Dec. 13, 2012, which was published in the English language on Jun. 20, 2013 as International Publication No. WO 2013/088159. International Application No. PCT/GB2012/053133 claims the benefit of United Kingdom Patent Application No. 1121501.9 filed Dec. 14, 2011 and United Kingdom Patent Application No. 1205070.4 filed Mar. 22, 2012.

DESCRIPTION OF INVENTION

The present invention relates to a modulator, particularly, but not exclusively for use in a vehicle braking system.

Vehicle braking systems typically include a valve assembly known as a modulator which is connected to a source of pressurised fluid, the modulator being used to regulate supply of pressurised fluid to and from a fluid pressure operated brake actuator. The modulator has a supply inlet which is connected to the source of pressurised fluid, a delivery port which is connected to the brake actuator and an exhaust outlet which is connected to the atmosphere (or any other low pressure volume), and can adopt a build position in which flow of fluid between the supply inlet and the delivery port is permitted, an exhaust position in which flow of fluid between the delivery outlet and the exhaust outlet is permitted, and a hold position in which flow of fluid between any two of the exhaust inlet, delivery port and exhaust outlet is substantially prevented.

In conventional braking systems, control of the modulator is achieved using a pressurised fluid signal known as the braking demand signal. When there is driver demand for braking, the driver typically operates a foot pedal, and movement of the foot pedal generates a fluid signal which is transmitted to a control inlet of the modulator. Receipt of the braking demand signal causes the modulator to move to the build position, so that the supply of pressurised fluid from the source of pressurised fluid to the brake actuator required to operate the vehicle brake commences. When the fluid pressure in the brake actuator exceeds a predetermined level relative to the pressure of the braking demand signal, the modulator moves to the hold or "lapped" position. Finally, when the driver releases the brake pedal, there is no longer demand for braking, the braking demand signal is removed, and the modulator reverts to the exhaust position, so that the pressurised fluid in the brake actuator acting to apply the vehicle brake is exhausted to the atmosphere.

The control pressure required to move the modulator from the exhaust position to the build position is referred to as the cracking pressure of the modulator.

If the vehicle is provided with anti-lock braking, the braking system includes at least one electrically operable valve which can override the braking demand signal. This is controlled using an electronic braking control unit (ECU) in accordance with conventional ABS control algorithms momentarily to release the brake pressure by moving the modulator to the exhaust position, or hold the brake pressure by moving the modulator to the hold position, even if there is braking demand, if wheel lock is detected.

In electronic braking systems, the braking system is provided with electrically operable hold and exhaust valves. Operation of the foot pedal generates an electrical braking demand signal, and this is transmitted to the ECU, which operates the hold valve and exhaust valve to control the modulator to build, hold or release the pressure in the brake actuator as described above. In this case, supply of fluid to the control inlet is also from the supply of pressurised fluid.

An example of a prior art modulator is shown in our co-pending application no. WO10/094,962. This prior art modulator has a housing and a first movable member which divides the housing into a control chamber and a main chamber, the housing being provided with an inlet port, a delivery port and an exhaust port which connects the main chamber with the exterior of the housing. In use, the inlet port is connected to the source of pressurised fluid, the delivery port to a fluid pressure operated brake actuator, and the exhaust port to atmosphere. The modulator further includes a second movable member which has a first valve part and a second valve part and which is movable to engage the first valve part with a corresponding inlet valve part secured relative to the housing, engagement of the first valve part with the inlet valve part substantially preventing flow of fluid into the main chamber via the inlet port. The first movable member is provided with an exhaust valve part and is movable so that the exhaust valve part engages with the second valve part of the second movable member, engagement of the exhaust valve part with the second valve part substantially preventing flow of pressurised fluid out of the main chamber via the exhaust port. A spring is provided to urge the second movable member into engagement with the inlet valve part to close the inlet port.

When the modulator is in the exhaust position, the first valve part of the second movable member is engaged with the inlet valve part to close the inlet port, whilst the second valve part of the second movable member is spaced from the exhaust valve part, thus venting the main chamber (and also the delivery port) to atmosphere. When the modulator is in the build position, the second valve part of the second movable member is engaged with the exhaust valve part of the first movable member to close the exhaust port, whilst the first valve part of the second movable member is spaced from the inlet valve part. When the modulator is in the hold position, the first valve part of the second movable member is engaged with the inlet valve part to close the inlet port and the second valve part of the second movable member is engaged with the exhaust valve part of the first movable member to close the exhaust port.

The force pushing the first valve part of the second movable member and the inlet valve part together when the modulator is in the exhaust or hold positions is referred to as the reservoir seat energisation.

This prior art modulator is configured such that it can be reduced in size significantly compared to previous modulators whilst keeping the cracking pressure and reservoir seat energisation at acceptable levels.

According to a first aspect of the invention we provide a valve assembly including a housing and a first movable member which divides the housing into a control chamber and a main chamber, the housing being provided with an inlet port, a delivery port and an exhaust port which connect the main chamber with the exterior of the housing, the valve assembly further including a second movable member which has a first valve part and a second valve part and which is movable parallel to an axis of the valve assembly to engage the first valve part with a corresponding inlet valve part secured relative to the housing, engagement of the first valve part with the inlet valve part substantially preventing flow of fluid into the main chamber via the inlet port, the first movable member being provided with an exhaust valve part and movable so that the exhaust valve part engages with the second valve part of the second movable member, engagement of the exhaust valve part with the second valve part substantially preventing flow of pressurised fluid out of the main chamber via the exhaust port, characterised in that the valve assembly is further provided with a support part, there being a first seal between the second movable member and the support part and a second seal between the support part and the first movable member.

An advantage of this configuration of valve assembly over the prior art modulator discussed above it is possible to arrange the seals in the valve assembly according to the first aspect of the invention such that, when the valve assembly is in the hold configuration, there is (neglecting friction) a one-to-one relationship between the pressure of fluid in the control chamber and the pressure of fluid in the main chamber, without adversely affecting the size of the exhaust port relative to the supply inlet.

The support part is preferably fixed relative to the housing.

In one embodiment of the invention, the valve assembly is provided with a third seal which provides a substantially fluid tight seal between the housing around the exhaust port and the second movable member so that fluid in the main chamber can only flow through the exhaust port via an aperture provided in the second movable member.

Preferably, the inlet valve part is provided on a tubular extension which extends through an aperture provided in the first movable member and provides a conduit for flow of fluid from the supply inlet to the main chamber.

In this case the valve assembly may be provided with a fourth seal between the first movable member and the tubular extension.

Preferably the areas enclosed by the second seal and fourth seal are equal.

In one embodiment of the invention, the areas enclosed by the second seal, third seal and fourth seals are equal.

In another embodiment of the invention, the area enclosed by the third seal is greater than the areas enclosed by the second and fourth seals.

Advantageously, the second seal, third seal and fourth seal all form circles.

Preferably the second seal, third seal and fourth seal are arranged coaxially about the axis of the valve assembly.

The area enclosed by the line of contact between the exhaust valve part and the second valve part of the second movable member may be greater than the area enclosed by the third seal.

Preferably, the area enclosed by the first seal is less than the area enclosed by the second, third and fourth seals.

Preferably, the area enclosed by the first seal is substantially identical to the area enclosed by the points of contact between the inlet valve part and the first valve part of the second movable member.

In one embodiment of the invention, the support part is supported on a mounting part which is located in the exhaust port. The support part may include a rod part, a first end of which is secured to the mounting part, and a reaction piston being provided on the second end of the rod part. In this case, the reaction piston may have a first part which provides the first seal and a second part which provides the second seal.

Figure 2:
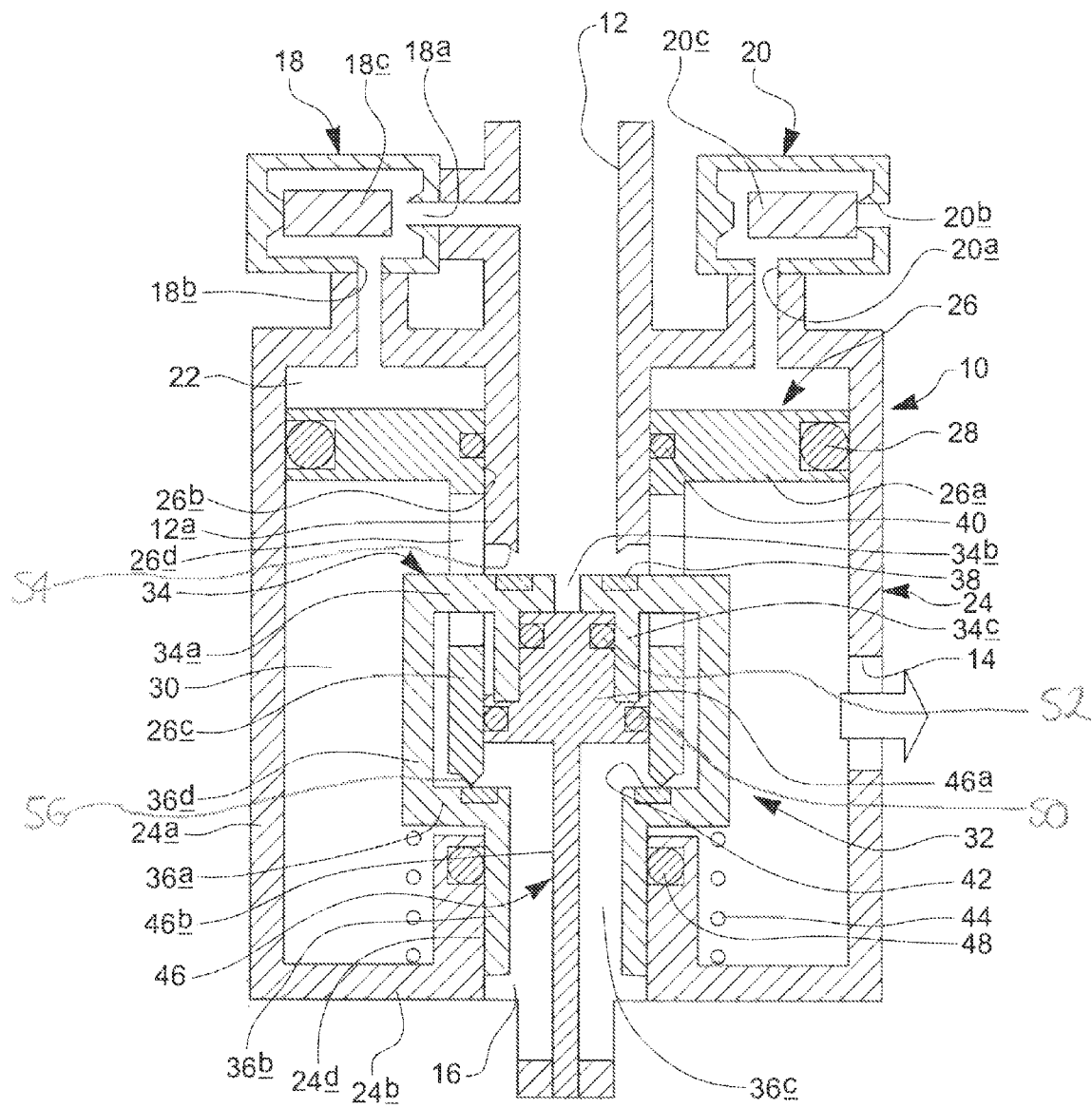
Figure 3:
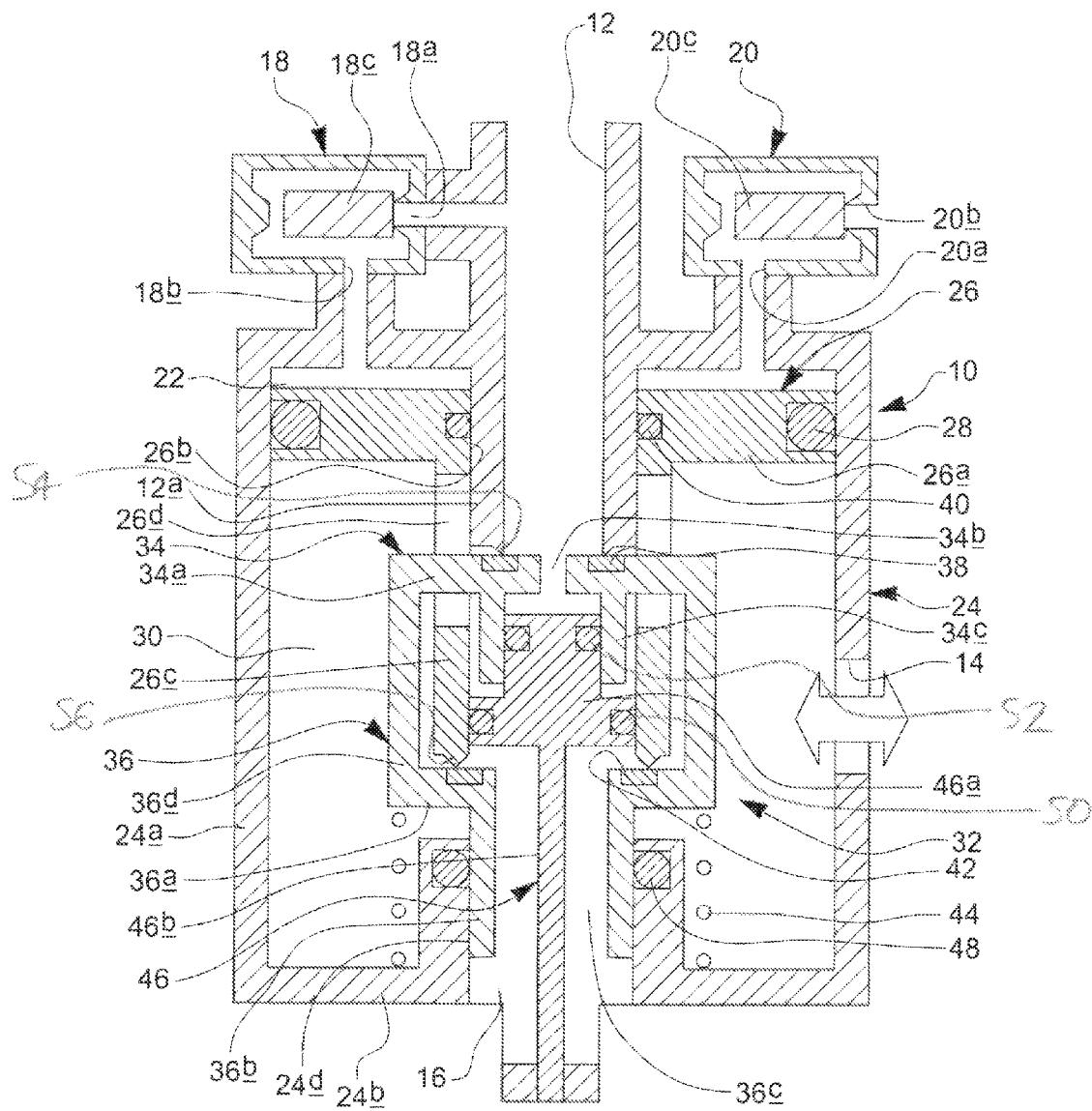
Figure 4:
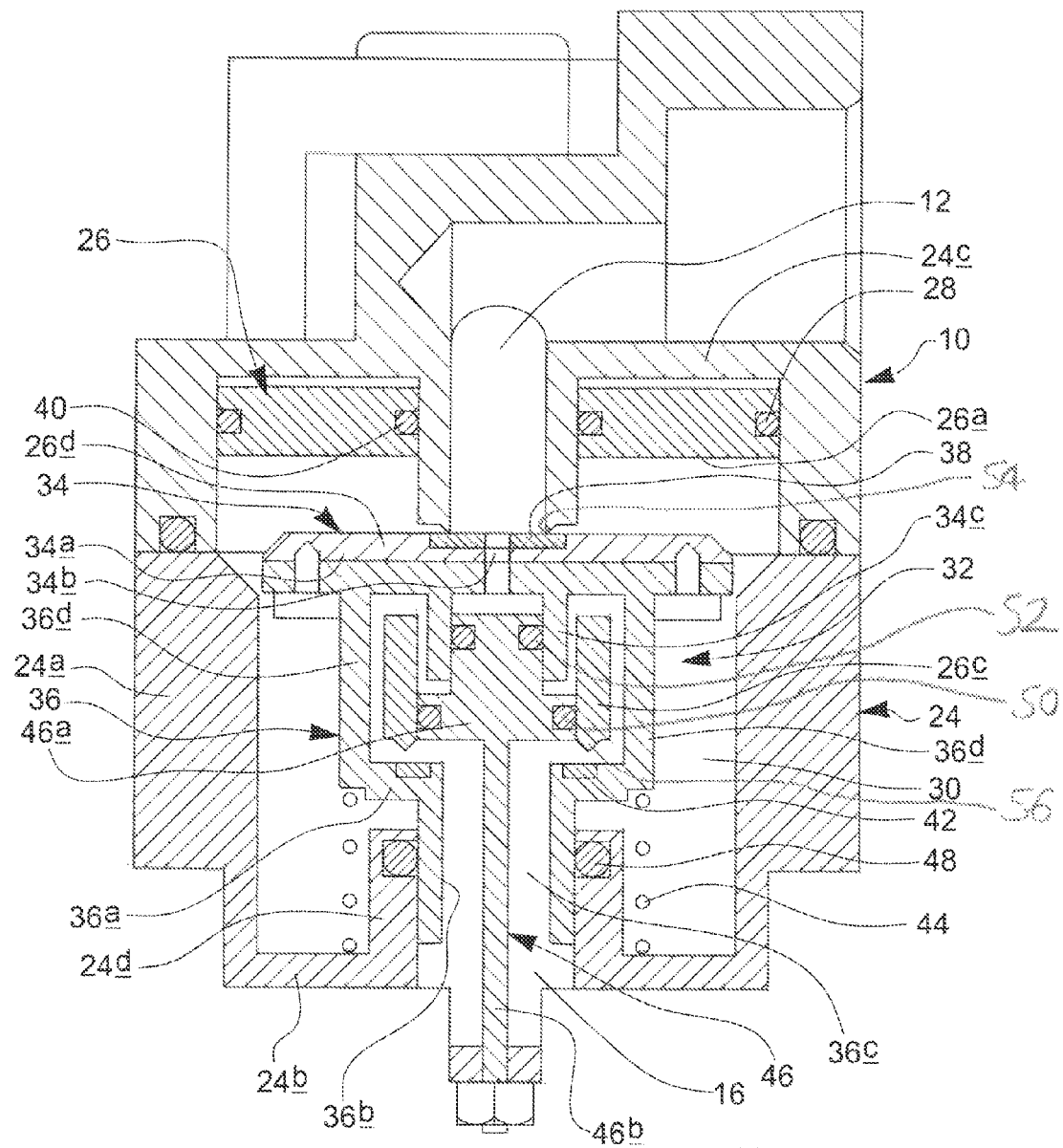
Figure 5:
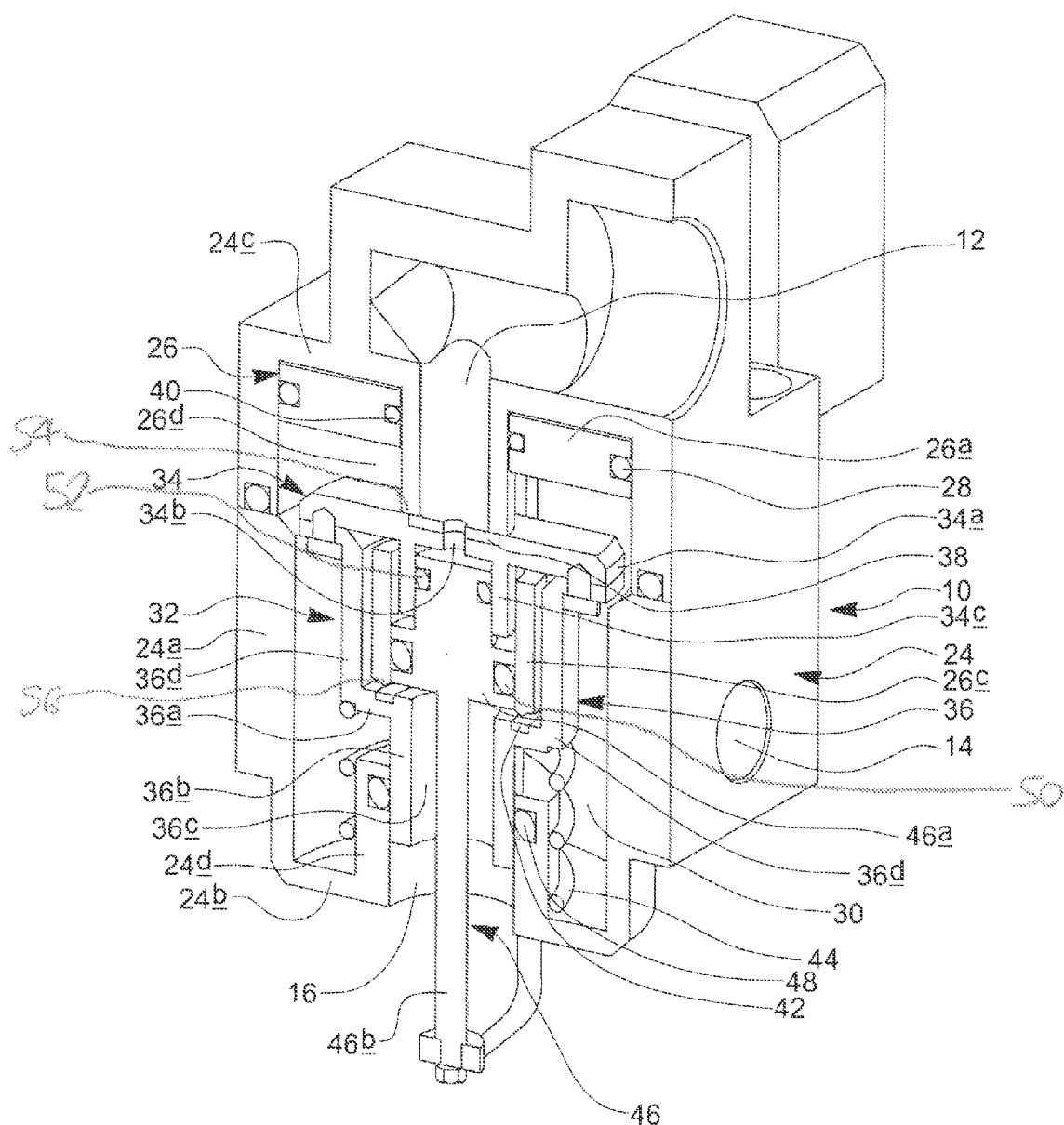
Figure 6:
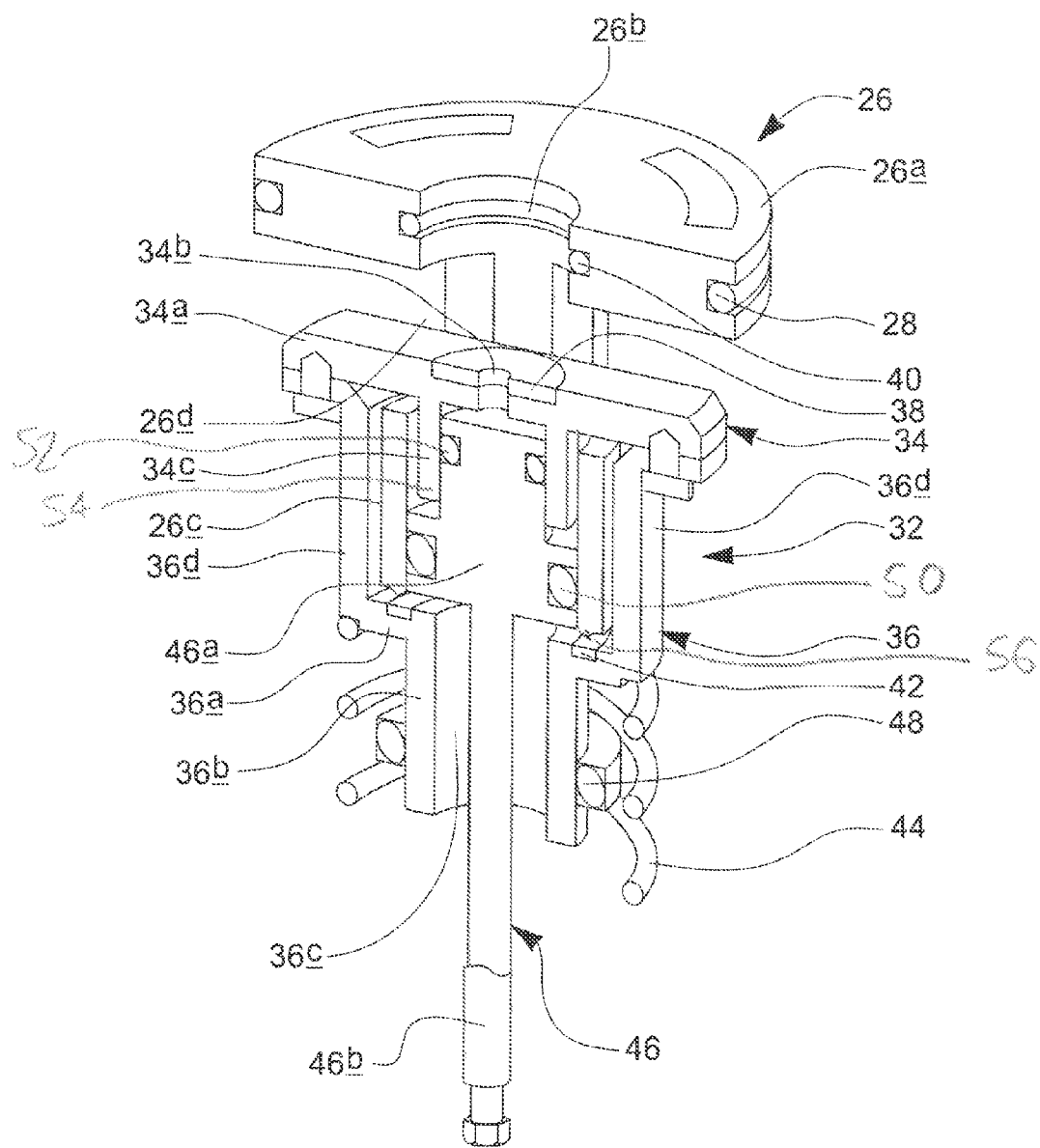
Figure 7:
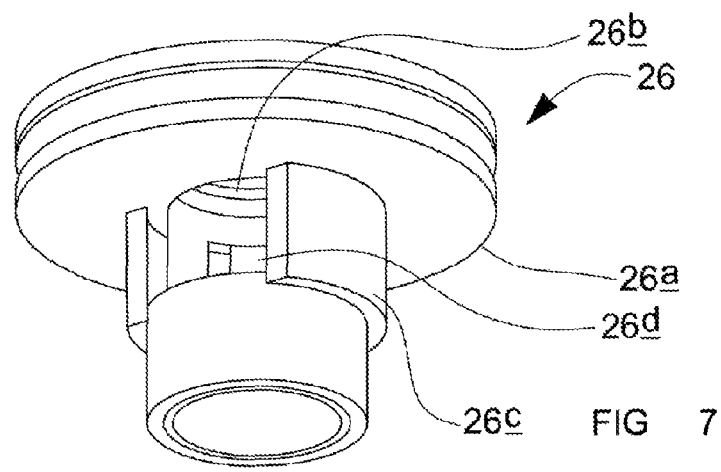
Figure 8:
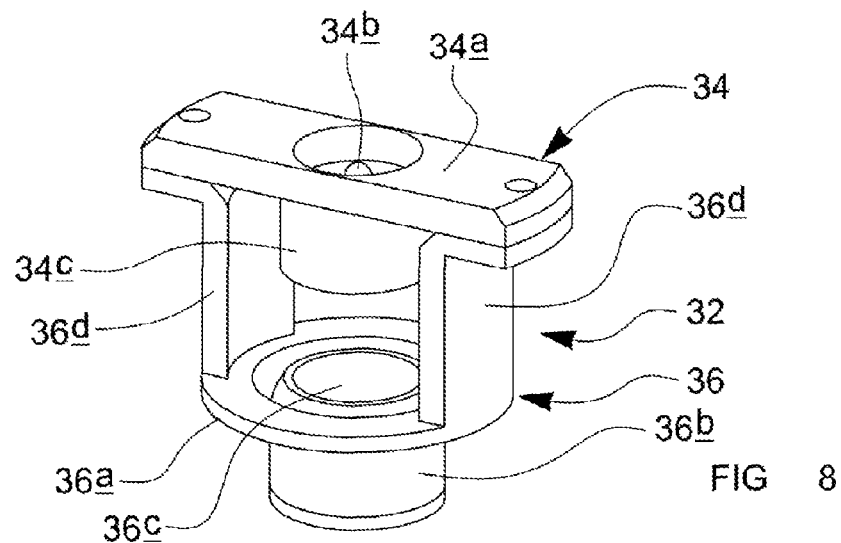
Figure 9:
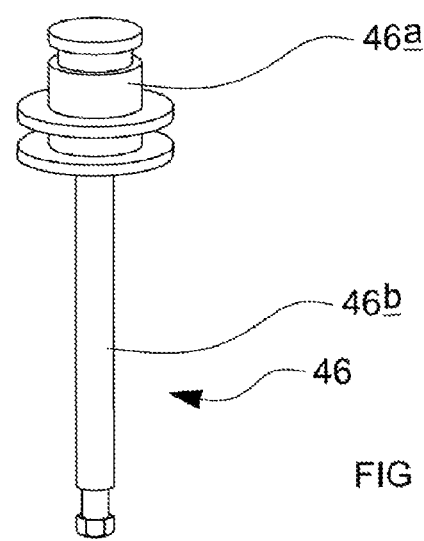
Figure 10:
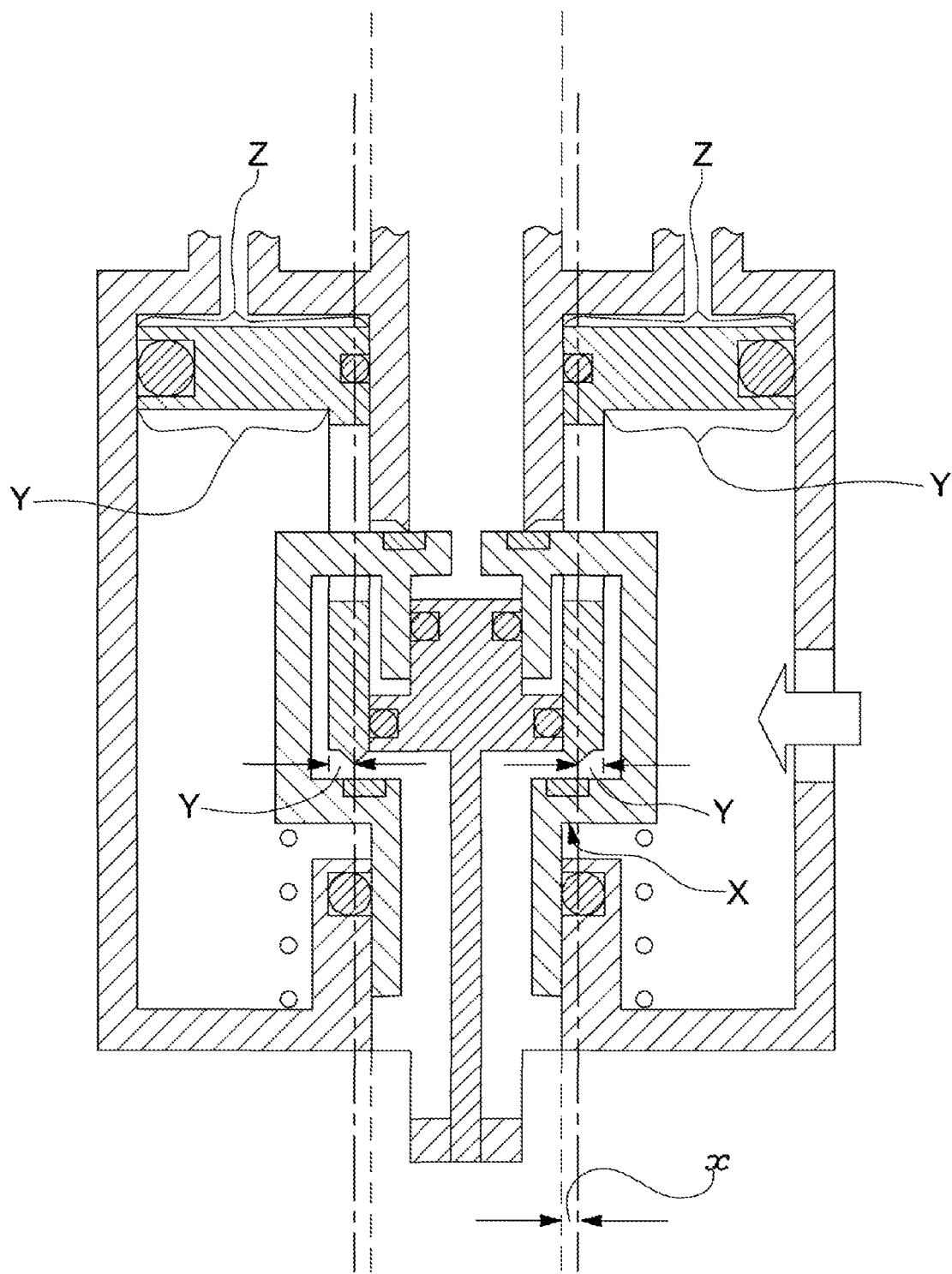
Figure 11:
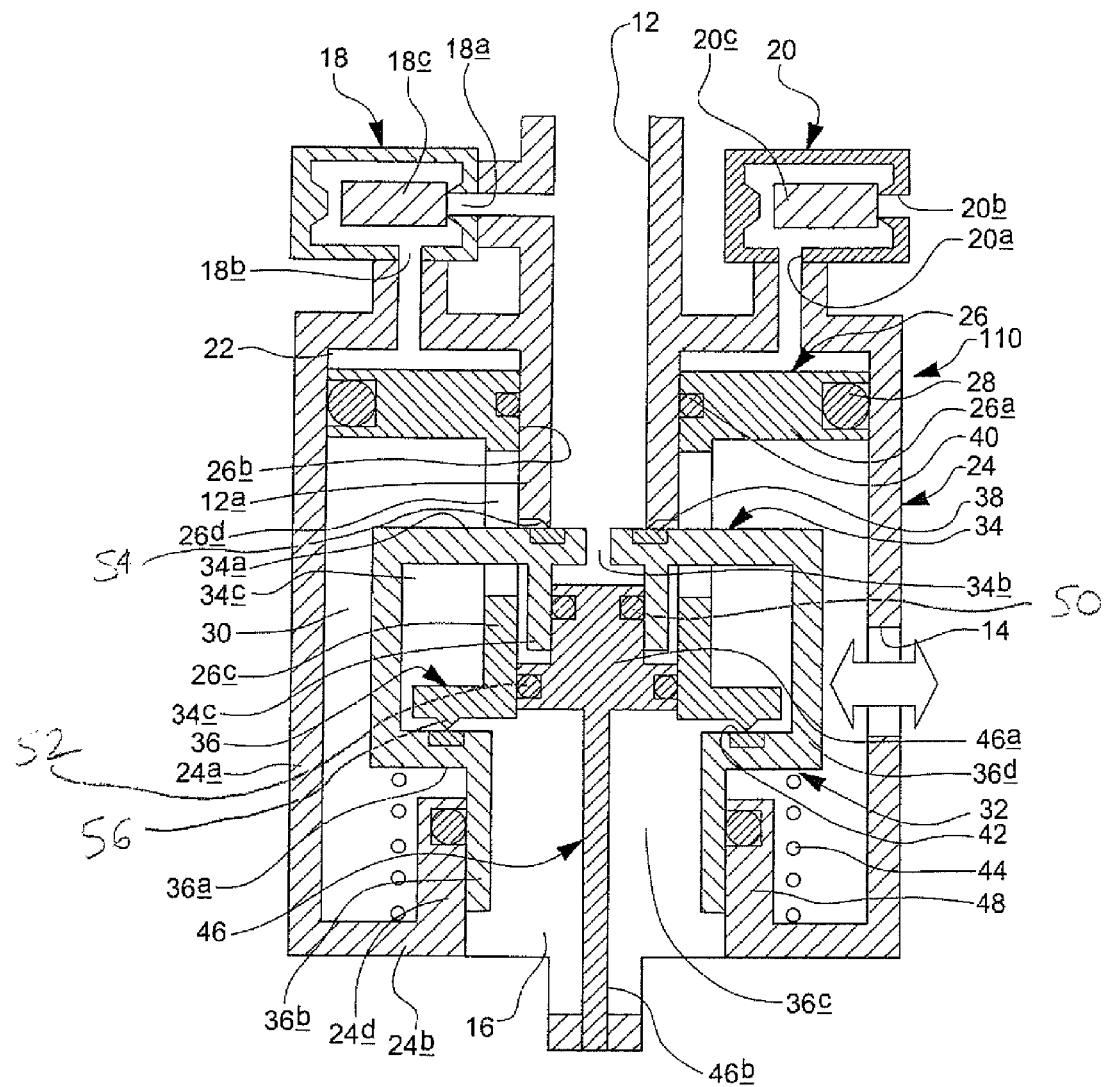
Figure 12:
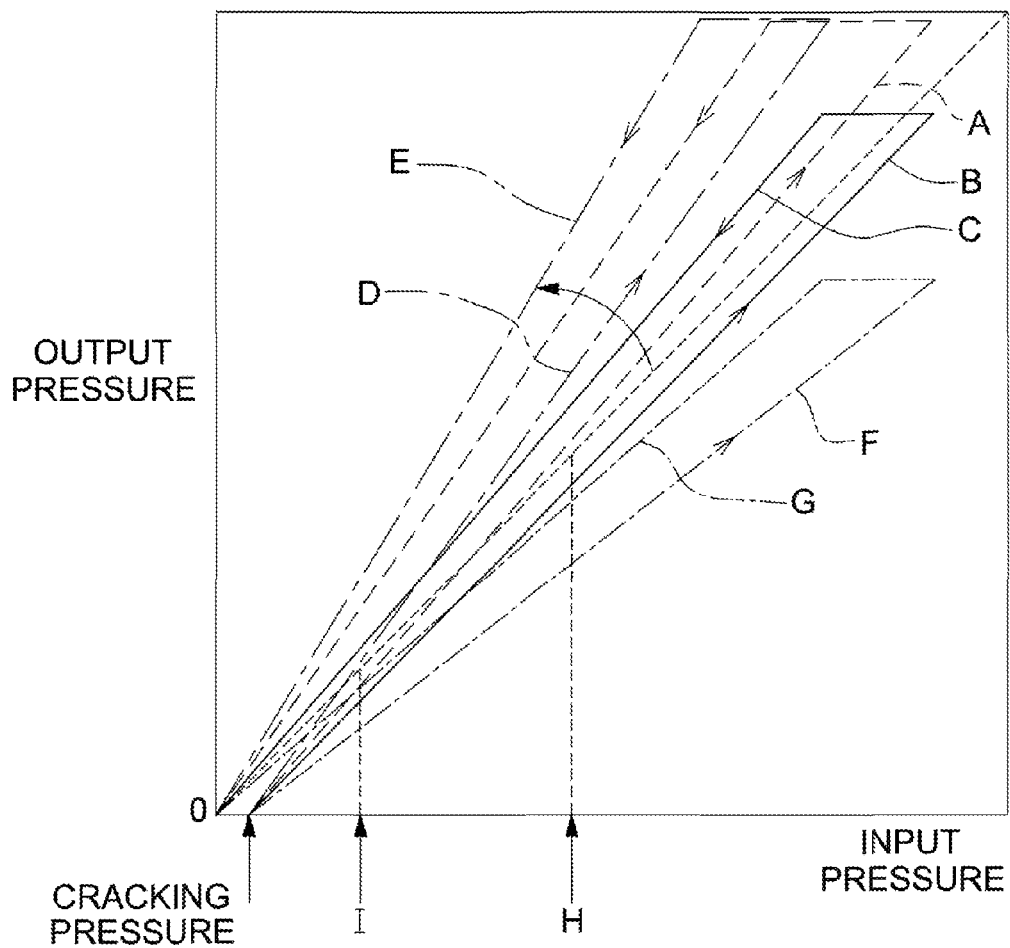

An embodiment of the invention will now be described, by way of example only, and with reference to the accompanying figures, of which:

FIG. 1 shows a schematic illustration of a modulator including a valve assembly according to the invention in the exhaust configuration, FIG. 2 shows a schematic illustration of the modulator shown in FIG. 1 but in the build configuration, FIG. 3 shows a schematic illustration of the modulator shown in FIG. 1 in the hold configuration, FIG. 4 shows a cross-section of a modulator according to the invention, FIG. 5 shows a perspective view of a cross-section of the modulator shown in FIG. 4, FIG. 6 shows a perspective view of a cross-section through the piston assembly and piston support of the modulator shown in FIGS. 4 and 5, FIG. 7 shows a perspective view of the control piston of the piston assembly shown in FIG. 6, FIG. 8 shows a perspective view of the main piston of the piston assembly shown in FIG. 6, FIG. 9 shows a perspective view of the piston support shown in FIG. 6, FIG. 10 shows an enlarged portion of the modulator shown in FIG. 1 in the hold configuration, FIG. 11 shows a schematic illustration of an alternative embodiment of the modulator according to the invention, and FIG. 12 is a graph illustrating the relationship between input pressure and output pressure for a prior art modulator, the modulator illustrated in FIGS. 1 to 10, and the modulator illustrated in FIG. 11.

Referring now to FIGS. 1-6, there is shown one embodiment of modulator 10 according to the invention. The modulator 10 includes a housing 24, which in this example is generally cylindrical, having a supply inlet 12 which is adapted to be connected to a compressed air reservoir (not shown), a delivery port 14 which is adapted to be connected to a brake actuator (not shown), and an exhaust port 16 which vents to atmosphere (or any other low pressure region). In one embodiment of the invention, the supply inlet 12 and exhaust port 16 are configured such that the area available for flow of fluid through the exhaust port 16 is approximately twice the area available for flow of fluid through the supply inlet 12.

There is also shown a first control valve (hereinafter referred to as hold valve 18) which has an inlet 18a which is connected to the supply inlet 12 of the modulator 10, and an outlet 18b which is connected to a control chamber 22 of the modulator 10, and a second control valve (hereinafter referred to as exhaust valve 20) which has an inlet 20a which is connected to the control chamber 22 and an outlet 20b which vents to the atmosphere. The hold valve 18 has a valve member 18c which is movable from an open position in which flow of fluid between the supply inlet 12 and the control chamber 22 is permitted, and a closed position in which flow of fluid between the control chamber 22 and the supply inlet 12 is substantially prevented. Similarly, the exhaust valve 20 has a valve member 20c which is movable between an open position in which venting of fluid from the control chamber 22 to the atmosphere is permitted, and a closed position in which flow of fluid from the control chamber 22 to atmosphere is substantially prevented. Typically each of the valve members 18c, 20c is moved between the open and closed positions using an electrical actuator such as a solenoid or a piezoelectric element.

The control chamber 22 is located in the space between the modulator housing 24 and a first movable member. The first movable member could be a diaphragm but, in this example, is a piston 26, hereinafter referred to as the control piston 26, and is movable within the housing 24 to vary the volume of the control chamber 22. A seal is provided between the control piston 26 and the housing 24 to contain fluid in the control chamber 22. In this example, the seal is an O-ring 28 provided in a circumferential groove in the control piston 26 which engages with the side wall of the housing 24 to provide a substantially fluid tight seal between the housing 24 and the control piston 26. A space within the housing 24 on the opposite side of the control piston 26 to the control chamber 22 is hereinafter referred to as the main chamber 30.

The supply inlet 12, the delivery port 14 and the exhaust port 16 all comprise conduits from the exterior of the housing 24 into the main chamber 30, but, in this embodiment of the invention, only the delivery port 14 and exhaust port 16 are provided in the portions of the housing 24 directly enclosing the main chamber 30. The supply inlet 12 is provided in a portion of the housing 24 enclosing the control chamber 22. Specifically, the delivery port 14 comprises an aperture in a side wall 24a of the housing 24, whilst the exhaust port 16 is located in an end face 24b of the housing 24, the end face 24b extending generally perpendicular to the direction of travel of the control piston 26 and the main chamber 30 being located between the end face 24b and the control piston 26. The supply inlet 12 is, however, positioned differently, and is located in a top face 24c of the housing 24, the top face 24c being opposite to the end face 24b so that the control chamber 22 is located between the top face 24c and the control piston 26.

Of course, if the supply inlet 12 were simply an aperture through the housing 24, being located in this top face 24c of the housing 24 would mean that it would communicate with the control chamber 22. In order to fulfill its function of the supply of pressurised fluid to the delivery port 14, in this embodiment of the invention, the supply inlet 12 needs to communicate with the main chamber 30. As such, a tubular extension 12a extends from the housing 24 around the aperture forming the supply inlet 12 into the control chamber 22, through a generally central aperture 26b provided in the control piston 26 and into the main chamber 30. A further seal, again in this example an O-ring 40, is provided in the aperture 26b in the control piston 26 to provide a substantially fluid tight seal between the control piston 26 and the outer diameter of the tubular extension 12a. Thus, movement of the control piston 26 relative to the modulator housing 24 is permitted whilst maintaining separation of the fluid in the control chamber 22 from the fluid in the main chamber 30.

A second movable member, which could be a diaphragm, but in this example is a piston 32, hereinafter referred to as the main piston 32, is provided in the main chamber 30. The main piston 32 is also movable relative to the housing 24 to increase or decrease the separation between it and the control piston 26. A resilient biasing element, in this example a helical compression spring 44, is provided between the main piston 32 and the end face 24b of the housing 24, the spring 44 being compressed when there is movement of the main piston 32 from its equilibrium position closest to the control piston 26 towards the end face 24b of the housing 24 (i.e. away from the control piston 26).

The main piston 32 is movable between an exhaust position (illustrated in FIG. 1) in which it substantially prevents flow of fluid through the supply inlet 12, whilst permitting flow of fluid between the delivery port 14 and the exhaust port 16, a build position (illustrated in FIG. 2) in which it substantially prevents flow of fluid through the exhaust port 16, whilst permitting flow of fluid between the supply inlet 12 and the delivery port 14, and a hold position (illustrated in FIG. 3) in which it substantially prevents flow of fluid through either the supply inlet 12 or the exhaust port 16.

An example of one possible configuration of the main piston 32 is illustrated in detail in FIGS. 4, 5, 6 and 8. In this example, the main piston 32 comprises a first part 34 and a second part 36. The first part 34 comprises a generally rectangular plate 34a with a generally central circular aperture 34b, and a tubular portion 34c, the tubular portion extending from around the aperture 34c generally normal to the plate 34a. The second part 36 comprises an annular plate 36a with a central aperture 36c, a tubular portion 36b which extends from around the central aperture 36c generally normal to the annular plate 36a, and two generally L-shaped connectors 36d. Each connector 36d has a first portion which extends from the opposite side of the annular plate 36a to the tubular portion 36b, generally normal to the plane of the plate 36a, and a second portion which extends generally perpendicular to the first portion at an opposite end of the first portion to the annular plate 36a. The two connectors 36d are diametrically opposite one another on the annular plate 36a, with the second portion being secured (in this example bolted) to the generally rectangular plate 34a of the first part 34.

The main piston 32 provides two valve parts 38, 42, the first of which is hereinafter referred to as the reservoir seat 38, and the second of which is hereinafter referred to as the exhaust seat 42. In this embodiment of the invention, the reservoir seat 38 comprises a circular area of the rectangular plate 34a on the side of the plate 34a opposite the tubular portion 34c and surrounding aperture 34b, and the main piston 32 is positioned in the main chamber 30 such that the reservoir seat 38 is adjacent the tubular extension 12a of the supply inlet 12. The exhaust seat 42 comprises a circular area of the annular plate 36a on the side of the plate 36a opposite the tubular portion 36b and surrounding aperture 36c.

As best illustrated in FIG. 7, in this embodiment of the invention, the control piston 26 comprises an annular plate 26a with the central aperture 26b and a tubular portion 26c extending generally normal to the plane of the annular plate 26a and surrounding the aperture 26b. The control piston 26 is arranged such that this tubular portion 26c extends around the tubular extension 12a of the supply inlet 12 to the main piston 32. The main piston 32 is arranged so that the tubular portion 34c of the first valve part 34 of the main piston 32 is partially enclosed by the tubular portion 26c of the control piston 26 whilst the first portions of the two connectors 36d lie radially outwardly with respect to the tubular portion 26c of the control piston 26. The exhaust seat 42 is thus adjacent to the free end of the tubular portion 26c of the control piston 26.

To facilitate the connection between the first and second parts 34, 36 of the main piston 32, two apertures 26d are provided in the tubular extension 26c, and the rectangular plate 34a of the first part 34 of the main piston 32 extends through these apertures 26d, as best illustrated in FIG. 6.

The main piston 32 is supported in the main chamber 30 by means of a support part 46 which, in the embodiment of the invention described above, comprises a top-hat shaped reaction piston 46a supported on a rod 46b. In the example shown in FIGS. 4, 5, 6, and 9, the rod 46b is bolted to a support located generally centrally of the exhaust aperture. The reaction piston 46a has a larger outer diameter portion and a smaller outer diameter portion each of which has a seal 50, 52 (in this example an O-ring) located in a circumferential groove. The smaller diameter portion extends into the tubular portion 34c of the first part 34 of the main piston 32 so that its O-ring 52 forms a substantially fluid tight seal with the tubular portion 34c whilst allowing the main piston 32 to slide relative to the reaction piston 46a. The larger diameter portion is surrounded by the tubular portion 26c of the control piston and its O-ring 50 forms a substantially fluid tight seal with the tubular portion 26c of the control piston 26 whilst allowing the control piston 26 to slide relative to the reaction piston 46a.

A further seal is provided between the main piston 32 and the housing 24 by means of an exhaust seal 48 (shown in FIGS. 1, 2 and 3 as an O-ring, and in FIGS. 4, 5 and 6 as a Z-seal) which is located in a circumferential groove provided in the radially inward facing surface of a tubular housing portion 24d which extends from around the exhaust port 16 into the main chamber 30. The tubular housing portion 24d surrounds the tubular portion 36b of the second part 36 of the main piston 32, and the exhaust seal 48 provides a substantially fluid tight seal between the main piston 32 and the housing 24 whilst allowing the main piston 32 to slide along the tubular portion 24d of the housing 24. The spring 44 surrounds the tubular housing portion 24d to extend between the end face 24b of the housing 24 and the annular plate 36a of the second part 36 of the main piston 32.

As mentioned above, the main piston 32 is biased by the spring 44 towards the control piston 26 such that, when there are no other forces acting on the main piston 32, the reservoir seat 38 is urged into engagement with an inlet valve part—in this example a generally circular ridge 54 provided at the end of the tubular extension 12a around the supply inlet 12. This ridge 54 surrounds the aperture of the supply inlet 12, and it will be appreciated that when the main piston 32 is in this position, fluid at the supply inlet 12 is substantially restricted to flowing through the aperture 34b and into the tubular portion 34c of the first part 34 of the main piston 32, where it is contained by the reaction piston 46a. As such, bringing the reservoir seat 38 into engagement with this ridge 54 amounts to closing of the supply inlet 12.

In this example, the line of contact between the tubular extension 12a and the reservoir seat 38 forms a circle, and the main piston 32 and reaction piston 46a are configured such that the line of contact between the seal in the smaller diameter portion of the reaction piston 46a and the tubular portion 34c of the first part 34 of the main piston 32 also forms a circle, both circles being coaxial and having substantially the same diameters. This means that the area enclosed by the points of contact between the tubular extension 12a and the reservoir seat 38 is substantially the same as the area enclosed by the points of contact between the main piston 32 and the smaller diameter portion of the reaction piston 46a. As a result of this, allowing fluid at the supply inlet 12 to pass into the tubular portion 34c of the first part 34 of the main piston 32 ensures that, when the reservoir seat 38 is engaged with the ridge 54 at the end of the tubular extension 12a, there is essentially no net force exerted on the main piston 32 by the reservoir pressure. In other words, the reservoir pressure does not contribute to the reservoir seat energisation.

It should be appreciated that whilst this arrangement is advantageous in substantially eliminating the effect of reservoir pressure on the reservoir seat energisation, the reservoir seat 38 may be provided on a generally circular end cap, with no central aperture. In this case, however, it will be appreciated that when the tubular extension 12a is engaged with the reservoir seat 38, reservoir pressure will tend to push the main piston 32 downwards. The strength of the spring 44 would therefore have to be selected to prevent the reservoir pressure pushing the reservoir seat 38 out of engagement with the tubular extension 12a.

In this example, a free end 56 of the tubular portion 26c is provided with a ridge and acts as an exhaust valve part. The control piston 26 is moveable in the housing 24 until the free end 56 of the tubular portion 26c of the control piston 26 engages with the exhaust valve seat 42. When this occurs, the seals between the tubular portion 26c of the control piston 26 and the exhaust seat 42 and between the tubular portion 26c of the control piston 26 and the reaction piston 46a act substantially to prevent flow of fluid into the central aperture 36c of the second part 36 of the main piston 32. Flow of fluid out of the main chamber 30 via the exhaust port 16 is therefore substantially prevented. As such, bringing the exhaust seat 42 into engagement with the control piston 26 amounts to closing the exhaust port 16.

Typically the main piston 32 is made from a generally rigid material, which may be a metallic or plastics material, and if this is the case, the reservoir seat 38 and/or exhaust seat 42 may constitute an annular rubber insert which may deform when engaged with the inlet valve part or the exhaust valve part to improve the quality of the seal provided by the seats 38, 42.

Flow of fluid between the supply inlet 12, the delivery port 14, and the exhaust port 16 is controlled by movement of the control piston 26 and the main piston 32 as follows:

When there is no braking demand, the modulator 10 adopts the exhaust configuration as illustrated in FIG. 1. The hold valve 18 is in the closed position, and the exhaust valve 20 is in the open position. The control chamber 22 is therefore vented to atmosphere and the control piston is located such that the volume of the control chamber 22 is at a minimum. The reservoir seat 38 is engaged with the tubular extension 12a of the supply inlet 12 so that flow of fluid from the supply inlet 12 to the delivery port 14 is substantially prevented, and the exhaust seat 42 is spaced from the control piston 26 so that flow of fluid from the delivery port 14 to the exhaust port 16 via the aperture 36c in the second part 36 of the main piston 32 is permitted. The delivery port 14, and hence the brake actuator is therefore vented to atmosphere, and no pressure is being applied at the brake.

When a braking demand signal is received, the hold valve 18 is operated so that the valve member 18c moves to the open position, and the exhaust valve 20 is operated so that the valve member 20c moves to the closed position. The control chamber 22 is therefore no longer venting to atmosphere, and flow of fluid from the reservoir into the control chamber 22 causes fluid pressure in the control chamber 22 to increase. The control piston 26 is acted on by this increasing pressure and moves towards the main piston 32 to increase the volume of the control chamber 22. As the control piston 26 moves, it comes into engagement with the exhaust seat 42 on the main piston 32. At this point, the delivery port 14 is no longer connected to the exhaust outlet 16.

As the fluid pressure in the control chamber 22 continues to increase, when it reaches a certain point, the force of the fluid pressure in the control chamber 22 acting on the control piston 26 is sufficiently large that the control piston 26 carries on moving to increase the volume of the control chamber 22 and therefore pushes the main piston 32 against the biasing force of the spring 44 so that the reservoir seat 38 moves out of engagement with the tubular extension 12a of the supply inlet 12. At this point, the supply inlet 12 can communicate with the delivery port 14, and flow of fluid from the reservoir to the brake actuator commences. The modulator 10 is said to be in the "build configuration", as illustrated in FIG. 2.

When the pressure in the brake actuator reaches the required level (this is typically determined using a pressure transducer which measures the delivery pressure in the brake actuator), and it is desired to hold that pressure, the hold valve 18 is operated to move the valve member 18c to the closed position. The control chamber 22 is therefore closed. As fluid continues to flow from the reservoir and into the modulator 10 via the supply inlet 12, fluid pressure in the main chamber 30 increases, and acts on main piston 32 and the control piston 26 against the pressure in the control chamber 22 to cause the pistons 26, 32 to move back to reduce the volume of the control chamber 22 until the reservoir seat 38 comes into engagement with the tubular extension 12a of the supply inlet 12. At this point, flow of fluid from the reservoir to the brake actuator is substantially prevented whilst the exhaust outlet 16 remains closed, and the modulator 10 reaches an equilibrium at which the fluid pressure in all parts of the modulator 10 remains constant. The modulator 10 is then said to be in the "hold configuration" as illustrated in FIG. 3.

To release the brake pressure, the exhaust valve 20 is operated to move the valve member 20c to the open position. The fluid in the control chamber 22 is vented to atmosphere, and the fluid pressure in the main chamber 30 of the modulator 10 acts on the control piston 26, pushing it out of engagement with the exhaust seat 32b. Fluid may then flow from the brake actuator into the delivery port 14 through the aperture 36c in the second part 36 of the main piston 32 and vented to atmosphere via the exhaust outlet 16. The modulator 10 thus returns to the "exhaust configuration" as illustrated in FIG. 1.

Whilst the general principal of operation of the inventive modulator 10 is identical to the prior art modulator disclosed in WO10/094,962, there are significant differences in relation to the various forces acting on the pistons 26, 32 during modulator operation, in particular as a result of providing seals between the reaction piston 46a (which is fixed relative to the housing 24) and both the control piston 26 and the main piston 32.

As mentioned above, the reservoir seat energisation is determined exclusively by the strength of spring 44. The exhaust seat energisation is the force urging the tubular portion 26c of the control piston 26 into engagement with the exhaust seat when the modulator 10 is in the build or hold positions.

When the modulator 10 is in the hold configuration as illustrated in FIG. 3, portions of the surface of the main piston 32 are exposed to the fluid in the main chamber 30. In most places, the forces resulting from this fluid pressure are matched by equal and opposite forces acting elsewhere on the main piston 32. There is, however, an area on the main piston 32 where this is not the case—specifically, in this example, the area on the lowermost face of the annular plate 36a of the second valve part 36 of the main piston 32 radially inwardly of the points of contact of the free end of the tubular portion 26c of the control piston 26 with the exhaust seat 42 (i.e. the area labelled X in FIG. 10). Over this area, the opposite side of the annular plate 36a is at atmospheric pressure, of course. Thus, the fluid pressure acting on this area X (hereinafter referred to as the main piston pressure active area) exerts a force on the main piston 32 which pushes it against the control piston 26—thus energising the exhaust seat.

The exhaust seat energisation thus depends on the radial separation (i.e. the separation perpendicular to the direction of travel of the main piston) of the points of contact of the exhaust seal 48 and the main piston 32 and the points of contact of the exhaust valve part (the free end of the tubular portion 26c of the control piston 26) and the exhaust seat 42 (labeled x in FIG. 10). If this separation x is increased, for example by increasing the diameter of the tubular portion 26c of the control piston 26 and the diameter of the exhaust seat 42, or by decreasing the diameter of the tubular housing portion 24d, the exhaust seat energisation can be increased. Similarly, if this separation x is decreased, for example by decreasing the diameter of the tubular portion 26c of the control piston 26 and the diameter of the exhaust seat 42, or by increasing the diameter of the tubular housing portion 24d, the exhaust seat energisation can be decreased.

For braking control purposes, it is, however, desirable to ensure that there is a one-to-one relationship between the pressure in the control chamber 22 and the pressure in the main chamber 30 when the modulator is in the hold configuration, over all delivery pressures (at least as far as possible give or take the effects of friction). Moreover, it is desirable that the area available for flow of fluid out of the exhaust port 16 is approximately twice the area available for flow of fluid through the supply inlet 12. If the exhaust port 16 is too small, flow of fluid out of the exhaust port 16 is significantly impeded, and the time taken to exhaust fluid from a brake actuator via the modulator is so long that the modulator would be effectively useless. It is impossible to achieve the desired one-to-one ratio in the prior art modulator arrangement without significantly decreasing the size of the exhaust port relative to the supply inlet.

The control piston 26 has a first side which is exposed to fluid in the control chamber 22 and a second side which is exposed to fluid in the main chamber 30, fluid pressure on the first side exerting a force pushing the control piston 26 towards the exhaust port 16 and fluid pressure on the second side exerting a force in the opposite direction. The configuration of the control piston 26 is such that not all its total surface area contributes to these forces. For example, the force produced by the downward pressure on the lowermost wall of the apertures 26d of the tubular extension 26c is balanced by an equal and opposite force produced by the upward pressure on the uppermost wall of these apertures 26d. The surface area of the control piston 26 which contributes to the upward force exerted by the fluid pressure in the main chamber 30 is hereinafter referred to as the control piston main pressure active area (labeled Y in FIG. 10), and the surface area which contributes to the downward force exerted by fluid pressure in the control chamber 22 is hereinafter referred to as the control piston control pressure active area (labeled Z in FIG. 10).

To achieve the desired one-to-one ratio (neglecting the effects of friction), it is necessary for the control piston control pressure active area to be equal to the sum of the control piston main pressure active area and the main piston pressure active area. In this embodiment of the invention, this is achieved by making the circles formed by the points of sealing contact between the control piston 26 and the tubular extension 12a around the supply inlet 12 at seal 40, between the main piston 32 and the housing 24d around the exhaust port 16 at seal 48, and between the tubular extension 12a around the supply inlet 12 and the reaction piston 46a, all substantially coaxial and identical in diameter. Fluid pressure acting within the circle enclosed by these contact points is supported by the reaction piston 46a, which is, of course, fixed relative to the housing 24. In contrast, in the annulus surrounding this circle, fluid pressure acts on the control piston 26 and the main piston 32.

When the valve is in the exhaust configuration, the control piston 26 is in equilibrium, so the forces acting on the control piston 26 derived from the pressure in the main chamber 30 (either directly or via the main piston 32) exactly balance the forces acting on the control piston 26 derived from the pressure in the control chamber 22. This equalisation of the pressure active areas means that, when these forces are balanced, the pressure in the main chamber 30 must equal the pressure in the control chamber 22.

Thus, to alter the exhaust seat energisation whilst maintaining this one-to-one relationship between the control pressure and delivery pressure, it would be necessary to alter only the diameter of the tubular portion 26c of the control piston 26 and the diameter of the exhaust seat 42 without changing the size or position of the seal between the tubular housing portion 24d around the exhaust port 16 and the main piston 32.

Whilst in the embodiment of the invention described above, all the seals and bearing surfaces of the moving parts are generally circular in transverse cross-section, this need not be the case. They could, for example, be square, hexagonal or any other shape, and, providing the area enclosed by the points of sealing contact between the control piston 26 and the tubular extension 12a around the supply inlet 12 at seal 40, between the main piston 32 and the housing 24d around the exhaust port 16 at seal 48, and between the tubular extension 12a around the supply inlet 12 and the reaction piston 46a are all equal, the one-to-one relationship described above can be achieved.

Whilst it will be appreciated that the modulator 10 described above is suitable for use in a conventional electronic vehicle braking system, as the control signal input into the control chamber 22 is derived from the source of pressurised fluid which is also used to actuate the brakes, it is not restricted to use in such a system. It should be appreciated that the modulator 10 could also be used in a non-electronic braking system (with or without anti-lock braking control) in which the control signal input into the control chamber 22 is derived from a fluid pressure braking demand signal which is generated as a result of the operation of the brake pedal. The modulator 10 may also be used in a hybrid system in which the control signal input into the control chamber 22 may either be derived from the source of pressurised fluid, or from a fluid pressure braking demand signal. In this case, the system also includes an additional valve which is operable to either direct fluid from the source of pressurised fluid to the hold valve 18, or to direct the fluid pressure braking demand signal to the hold valve 18.

Similarly, the delivery port 14 need not be connected directly to a brake actuator, and it may be connected to an inlet port of a further valve assembly (not necessarily according to the invention) such as a relay valve.

The valve assembly according to the invention may alternatively be used in a brake pedal assembly for a vehicle braking system. In this case, the valve assembly is in all respects identical to the valve assembly described above, except that movement of the control piston 26 is effected by virtue of a mechanical connection between the control piston 26 and a brake pedal rather than by fluid pressure control using hold valve 18 and exhaust valve 20. In this example the top face 24c of the housing 24 would be at least partially open, with a mechanical connector from the brake pedal extending into the housing 24 via an aperture in the top face 24c. A spring could be provided between the brake pedal and the control piston 26, to provide a degree of comfort for the driver whilst ensuring that movement of the brake pedal causes movement of the control piston.

In this case, rather than being connected directly to a brake actuator, the delivery port 14 is connected to a braking demand signal line, which is, in a purely pneumatic or hydraulic braking system, connected to the supply inlet of a modulator. Movement of the brake pedal may, therefore, control flow of pressurised fluid into the braking system, the flow of pressurised fluid thus comprising a pneumatic or hydraulic braking pressure demand signal.

Referring now to FIG. 11, there is shown a schematic illustration of an alternative embodiment of modulator 110. This is operated in exactly the same way as the modulator described above and differs from the modulator described above only in relation to the diameters of the exhaust seat 42 and the exhaust seal 48.

Specifically, in this embodiment of the invention the diameter of the exhaust seal 48 is increased relative to the diameters of the seal 40 between the control piston 26 and the tubular extension 12a around the supply inlet 12, and the seal between the tubular extension 12a and the reaction piston 46a.

Also, the diameter of the line of contact between the exhaust seat 42 and the tubular portion 26c of the control piston 26 are increased so that it is still greater than the diameter of the line of contact between the exhaust seal 48 and the second part 36. This ensures that fluid pressure in the main chamber 30 still acts to energise the exhaust seat as described above.

As mentioned above, for braking control purposes, it is desirable to achieve a one-to-one relationship between the pressure in the control chamber (the input pressure) and the pressure in the main chamber 30 (the output pressure) when the modulator is in the hold configuration, over all delivery pressures. In the first embodiment of the invention described above, this is achieved by making the circles formed by the points of sealing contact between the control piston 26 and the tubular extension 12a around the supply inlet 12 at seal 40, between the main piston 32 and the housing 24d around the exhaust port 16 at seal 48, and between the tubular extension 12a around the supply inlet 12 and the reaction piston 46a, all substantially coaxial and identical in diameter. This relationship is not necessarily required for all possible uses for the modulator, however.

FIG. 12 shows a graph of input pressure versus output pressure for various embodiments of modulator. The dashed line illustrates a perfect 1:1 relationship between input pressure and output pressure. Line A shows the relationship between input pressure and output pressure for a prior art modulator as the input pressure increases. Line B shows the relationship between input pressure and output pressure as the input pressure increases, and line C as the input pressure decreases, for the embodiment of modulator 10 described above. Similarly, Line D shows the relationship between input pressure and output pressure as the input pressure increases, and line E as the input pressure decreases, for the alternative embodiment of modulator 110.

All three types of modulators show a degree of hysteresis in the relationship between input pressure and output pressure, because of the effects of friction between the various moving parts and seat energisation forces. It is the relationship between the input pressure and output pressure as the pressure increases that is of particular interest, however.

It can be seen that for the prior art modulator, the input/output pressure line A is inclined relative to the perfect 1:1 line. As such, there is an exact 1:1 relationship between the input pressure and output pressure at one output pressure only (output pressure H). For the first embodiment of modulator 10 described above, the input/output pressure line B is generally parallel to the perfect 1:1 line, it being offset so that the output pressure is lower than the input pressure by an amount approximately equal to the cracking pressure over all pressures.

As a result of the increase in the diameter of the line of contact between the exhaust seal 48 and the second part 36, the input/output pressure line D for the alternative embodiment of modulator 110 is also inclined relative to the perfect 1:1 line, so that at low input pressures, the output pressure is less than the input pressure, whilst at high input pressures, the output pressure is greater than the input pressure. This means that, just like for the prior art modulator, there is an exact 1:1 relationship between the input pressure and output pressure at one output pressure only (output pressure I).

The greater the diameter of the line of contact between the exhaust seal 48 and the second part 36 relative to the diameters of the circles formed by the points of sealing contact between the control piston 26 and the tubular extension 12*a* around the supply inlet 12 at seal 40, and between the tubular extension 12*a* around the supply inlet 12 and the reaction piston 46*a*, the greater the incline. This means that the pressure at which there is an exact 1:1 relationship between the input pressure and output pressure can be altered simply by altering the diameter of the line of contact between the exhaust seal 48 and the second part 36 relative to the diameters of the circles formed by the points of sealing contact between the control piston 26 and the tubular extension 12*a* around the supply inlet 12 at seal 40, and between the tubular extension 12*a* around the supply inlet 12 and the reaction piston 46*a*. Specifically, the 1:1 output pressure I can be decreased by increasing the diameter of the line of contact between the exhaust seal 48 and the main piston 32.

It should also be appreciated that the incline of the input/output pressure line can be decreased so that it never crosses the perfect 1:1 line, and the output pressure is always lower than the input pressure by an amount which increases as the input pressure increases, by configuring the valve assembly such that the diameter of the line of contact between the exhaust seal 48 and the second part 36 is less than the diameters of the circles formed by the points of sealing contact between the control piston 26 and the tubular extension 12*a* around the supply inlet 12 at seal 40, and between the tubular extension 12*a* around the supply inlet and the reaction piston 46*a*. An example of the input/output pressure lines F, G for such an arrangement is also shown in FIG. 12.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A valve assembly including a housing and a first movable member which divides the housing into a control chamber and a main chamber, the housing being provided with an inlet port, a delivery port and an exhaust port which connect the main chamber with the exterior of the housing, the valve assembly further including a second movable member which has a first valve part and a second valve part and which is movable parallel to an axis of the valve assembly to engage the first valve part with a corresponding inlet valve part secured relative to the housing, engagement of the first valve part with the inlet valve part substantially preventing flow of fluid into the main chamber via the inlet port, the first movable member being provided with an exhaust valve part and movable so that the exhaust valve part engages with the second valve part of the second movable member, engagement of the exhaust valve part with the second valve part initiating closing of the exhaust port, closing of the exhaust port substantially preventing flow of pressurized fluid out of the main chamber via the exhaust port, characterized in that the valve assembly is further provided with a support part, there being a first seal between the second movable member and the support part and a second seal between the support part and the first movable member.

2. The valve assembly according to claim 1 wherein the support part is fixed relative to the housing.

3. The valve assembly according to claim 1 wherein the valve assembly is provided with a third seal which provides a substantially fluid tight seal between a portion of the housing around the exhaust port and the second movable member so that fluid in the main chamber can only flow through the exhaust port via an aperture provided in the second movable member.

4. The valve assembly according to claim 1 wherein the inlet valve part is provided on a tubular extension which extends through an aperture provided in the first movable member and provides a conduit for flow of fluid from the supply inlet to the main chamber.

5. The valve assembly according to claim 4 wherein the valve assembly is provided with a fourth seal between the first movable member and the tubular extension.

6. The valve assembly according to claim 5 wherein the areas enclosed by the second seal and fourth seal are equal.

7. The valve assembly according to claim 6 wherein the areas enclosed by the second seal, third seal and fourth seal are equal.

8. The valve assembly according to claim 6 wherein the area enclosed by the third seal is greater than the areas enclosed by the second and fourth seals.

9. The valve assembly according to claim 6 wherein the area enclosed by the third seal is less than the areas enclosed by the second and fourth seals.

10. The valve assembly according to claim 7 wherein the second seal, third seal and fourth seal all form circles.

11. The valve assembly according to claim 8 wherein the second seal, third seal and fourth seal are arranged coaxially about the axis of the valve assembly.

12. The valve assembly according to claim 3 wherein the area enclosed by the line of contact between the exhaust valve part and the second valve part of the second movable member is greater than the area enclosed by the third seal.

13. The valve assembly according to claim 4 wherein the area enclosed by the first seal is less than the area enclosed by the second, third and fourth seals.

14. The valve assembly according to claim 1 wherein the area enclosed by the first seal is substantially identical to the area enclosed by the points of contact between the inlet valve part and the first valve part of the second movable member.

15. The valve assembly according to claim 1 wherein the support part is supported on a mounting part which is located in the exhaust port.

16. The valve assembly according to claim 15 wherein the support part includes a rod part, a first end of which is secured to the mounting part, a reaction piston being provided on the second end of the rod part.

17. The valve assembly according to claim 16 wherein the reaction piston has a first part which provides the first seal and a second part which provides the second seal.

18. The valve assembly according to claim 1 wherein the valve assembly further includes at least one electrically operable valve to control flow of fluid into and/or out of the control chamber.

19. The vehicle braking system including a source of pressurized fluid, a fluid pressure operated brake actuator and a valve assembly according to claim 1 wherein the inlet port of the valve assembly is connected to the source of pressurized fluid, and the delivery port of the valve assembly is connected to the brake actuator.

* * * * *